Nov. 25, 1969 D. A. PORTER ET AL 3,480,790

LOAD DIVISION CIRCUIT

Filed May 18, 1967

INVENTOR.
DENNIS A. PORTER
ROBERT R. WHITE
BY Stanley C. Corwin
THEIR ATTORNEY 3,480,790
Patented Nov. 25, 1969

3,480,790

LOAD DIVISION CIRCUIT

Dennis A. Porter, Ada, Mich., and Robert R. White, Waynesboro, Va., assignors to General Electric Company, a corporation of New York Filed May 18, 1967, Ser. No. 639,527
Int. Cl. H02j *1/10, 3/00*
U.S. Cl. 307—57 5 Claims

ABSTRACT OF THE DISCLOSURE

A load division circuit for balancing the load supplied by paralleled DC generators. A differential amplifier is coupled to the series compensating windings of the parallel generators by a resistor in the emitter base circuit. The voltage differential realized when load unbalance is present appears across the resistor and serves to drive the normally balanced amplifier to apply an amplified differential to the generator voltage regulator.

Figure 1:
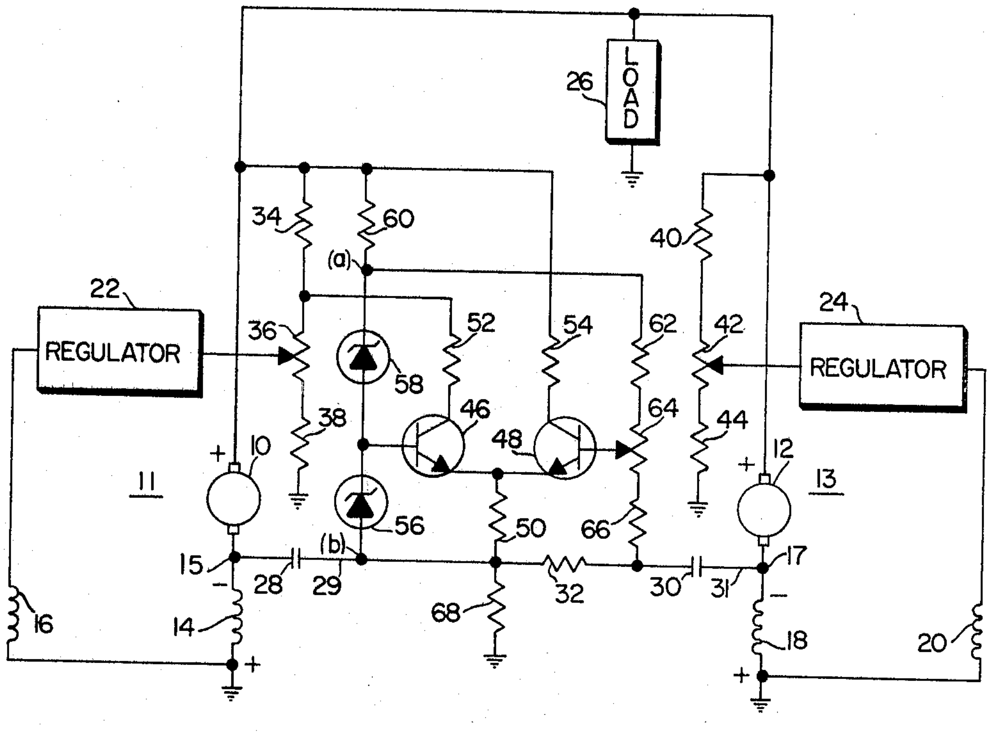

This invention relates to generator load balancing circuits and in particular a differential amplifier load balancing circuit.

Load division circuits for parallel coupled generators are of various types. One of the most common of these circuits is a carbon pile regulator circuit which contains compensation in the form of an extra winding which is sensitive to the difference in current flow between the series compensating windings of the generator to effect load balancing. Another device is a magnetic amplifier which is utilized for voltage regulation and also has an additional winding coupled between the compensating windings of the generators to effect equal load division. The problems with devices of this nature have been their weight, their need for adjustment and their drift with temperature. Electronic circuits have been devised to overcome these problems and still provide accurate load balancing. Since each generator, regulator, and load division circuit may be used on many occasions in parallel circuit relationship with other like combinations to supply a common load and on other occasions as a sole operating combination, there has arisen a need for an electronic load division circuit which is compatible with the other older forms of load division circuits so that interchangeability is readily obtained.

It is accordingly an object of the present invention to provide an electronic load division circuit that is compatible with the various other load division circuits.

Another object of the invention is to provide a load division circuit capable of indicating load division when coupled to two generators but does not affect the voltage regulation of its associated generator when the generator is operating as a single unit.

Another object of the present invention is to provide a load division circuit that is relatively temperature insensitive, of light weight and subject to minimal repair.

A further object of the present invention is to provide a load division circuit which operates directly from generator voltage and is protected against affecting voltage regulation when the connection to the generator compensating winding is interrupted.

In general, these objects and others are realized by a load division circuit utilizing a differential amplifier which has its base to emitter voltage potentials normally clamped to a fixed voltage for balanced quiescent operation. The collector of one of the transistors is coupled into the voltage sensing circuit of the voltage regulator for the associated generator and the commonly coupled emitter electrodes are coupled to a current path intercoupling the compensating windings of both the associated generator and the paralleled generator when load division detection and balancing is to be achieved. A resistor in the current path between the compensating windings is coupled to the common emitter resistor and to the base electrode of one of the transistors. When the load is not being equally shared by the paralleled generators, a different voltage drop is realized across the compensating winding of each generator which is realized as a voltage differential across the resistor. This differential upsets the quiescent condition of the differential amplifier and establishes a different voltage level that is sensed by the generator voltage regulator which in turn alters the excitation of the one generator to equalize load sharing.

Figure 2:
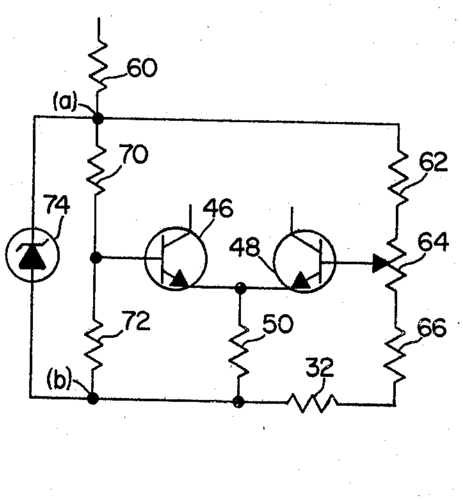

A better understanding of the invention may be obtained from a more detailed explanation which is taken in connection with examples of the invention shown in the drawings in which:

FIGURE 1 is a part schematic and part block diagram of a load division circuit according to the invention, and FIGURE 2 shows another version of the voltage clamping portion of the load division circuit.

Referring now to FIGURE 1, there is shown a generator 11 coupled in parallel circuit relationship with a generator 13 to supply a common load 26. The generator 11 has an armature 10, a series compensating winding 14 and a field winding 16 which is energized by a voltage regulator 22 which senses generator output voltage through a divider network including resistors 34, 36 and 38. The regulator 22 can be any of the well-known voltage regulators for DC generators. The generator 13 is of similar type to generator 11 and is normally a DC brush type generator having an armature 12, a series compensating winding 18 and a field 20 which is energized through a voltage regulator 24 which senses the generator output voltage through a voltage dividing network consisting of resistors 40, 42 and 44. With the exception of the equalizing current conductors 29 and 31 interconnecting the compensating windings 14 and 18 and the relay contactors 28 and 30, the remainder of the circuit shown in FIGURE 1 comprises the load division circuit of the present invention.

It should be understood that the term "compensating winding" is an inclusive term which may include a pole face winding which serves to reduce the reactance of the main field, and/or a commutating winding which shifts the neutral plane of the DC field to reduce commutation arcing, and/or an additive field winding to compensate for flux fall-off. Moreover, this term, compensating winding, is used to include any means which is capable of establishing a voltage proportional to generator output current. For example, even though this winding is referred to as a series compensating winding, the term is considered to include even a shunt impedance coupled across one of the above-mentioned windings where the impedance establishes a voltage proportional to generator current.

The load division circuit is basically a differential amplifier made up of transistors 46 and 48 with common emitter resistor 50 coupled to the compensating windings of the generators by resistor 32 and conductors 29 and 31. The collector of transistor 48 is coupled to the generator output by resistor 54 while transistor 46 is coupled to the generator output via resistors 34 and 52. Thus, the transistor 46 is in turn coupled to the regulator sensing circuit which includes the resistor 34. A voltage clamp made up of Zener diodes 58 and 56 is coupled dirrectly to the base of transistor 46 and to the base of transistor 48 by the voltage dividing network coupled across the Zener diodes. The adjustable voltage divider is made up of resistors 62 and 66 and variable resistor 64 which has its wiper arm connected directly to the base of transistor 48. It is noted that resistor 32 also forms a portion of this voltage dividing network. Resistor 60 couples the series connected Zener diodes to the positive polarity generator output which serves as a voltage supply to assure that these breakdown devices are maintained at their rated breakdown voltage.

When one of the generators due to its inherent properties supplies more current to the load than the other paralleled generator, its series compensating winding will develop a greater voltage drop than the series compensating winding of the other generator and thus a voltage differential is developed between these two compensating windings. This voltage differential is realized across the resistor 32. Since resistor 32 is coupled in the base-emitter circuit of transistor 48, this voltage differential is algebraically added to the constant voltage maintained at the base lead of transistor 48 via the wiper arm of variable resistor 64.

Thus it is seen that Zener diodes 58 and 56 maintain transistor 46 in a constant current conducting or quiescent mode of operation. Also by the coupling provided by the voltage divider made up of resistors 62, 64, 66 and 32 which is coupled to the base circuit of transistor 48, these Zener diodes maintain transistor 48 in a constant current conducting condition in the absence of a voltage differential across resistor 32. By adjustment of variable resistor 64, it is possible to maintain equal currents through the two transistors. When there is an unbalance of current supplied by the parallel generators, the voltage differential which appears across resistor 32 upsets the quiescent current conducting condition of the differential amplifier and causes the transistors to conduct either more heavily or to a lesser degree than their quiescent state depending upon the polarity of the voltage differential.

When generator 11 supplies more current to the load than generator 13, the greater current flow through the compensating winding 14 makes the point 15 more negative than the point 17 and thus from right to left there appears a positive to negative voltage differential across resistor 32. This added positive voltage appears between the base and emitter of transistor 48 causing this transistor to conduct harder which in turn lessens the current flowing through transistor 46 which raises the voltage sensed by the regulator 22 at resistor 36 thereby causing the regulator 22 to supply less excitation to field winding 16 since this regulator now senses an apparently higher generator output voltage and the load unbalance is corrected.

It should be realized that many variations of the circuit described can be realized. For example, resistor 32 need not form a part of the adjustable voltage dividing circuit consisting of resistors 62, 64 and 66 but instead can be located in the base-emitter circuit of transistor 46, i.e., resistor 32 could be coupled between point (*b*) and the point of interconnection of resistors 50 and 68. Also, it should be realized that while equal generator load sharing can be obtained with one load division circuit as shown in FIGURE 1, it is often the case that each generator will be packaged with its individual load division circuit and load equal load sharing is obtained with the use of two load division circuits. In this case, the load division circuit for generator 13 would be the mirror image of the circuit shown in the figure and each of the voltage sensing resistors such as resistor 32 will only realize one half of the voltage differential occasioned by unbalanced load division. It should also be realized that generator 13 could utilize any of the other various types of load division circuit voltage regulator combinations and they would be compatible with the load division circuit shown in FIGURE 1. This is primarily due to the fact that most of the other load division circuits rely on the equalizer current that flows between the compensating windings via leads 29, 31 to detect load unbalance, and resistor 32 which is optimumly only a fraction of an ohm, will not deteriorate this source of detection for other types of load division circuits.

Resistor 68 is added to the load division circuit and couples the common emitter resistor 50 to ground to provide a current path to ground which is no longer available via compensating winding 18 when parallel operation is not desired, i.e., contactors 30 are open, and when the equalizer current lead to the associated generator 11 is broken such as by interruption of the contacts 28.

FIGURE 2 shows an alternative embodiment of the voltage clamp portion of the differential amplifier load division circuit shown in FIGURE 1. The point (*a*) between resistor 60 and Zener diode 58 and (*b*) between Zener diode 56 and equalizer current conducting bus 29 are reproduced in FIGURE 2 to indicate the point of interconnection of the alternative circuit shown in FIGURE 2 into the load division circuit of FIGURE 1. Many of the elements of the circuit of FIGURE 1 which tie into points (*a*) and (*b*) are shown again in FIGURE 2 for ease in understanding the operation of the alternative voltage clamping circuit shown here. Actually, the FIGURE 2 embodiment is but an interchange of a single Zener diode 74 and a voltage dividing circuit comprising resistors 70 and 72 coupled thereacross with their point of interconnection coupled to the base of transistor 46 to replace the pair of Zener diodes 58 and 56 shown in FIGURE 1. The function of this circuit is essentially the same as that already described for the embodiment of the voltage clamping circuit shown in FIGURE 1. Zener diode 74 is in parallel with the voltage dividing network consisting of resistors 70 and 72 and the adjustable voltage dividing network consisting of resistors 62, 64, 66 and the voltage sensing resistor 32. The purpose of the voltage clamp at the base of each of the transistors 46 and 48 is to maintain a constant current conducting state in each of the transistors to establish the quiescent point of operation for the generator voltage regulator. Thus with each transistor supplying a fixed portion of the current through the common emitter resistor 50, such as half of the current, the voltage differential appearing across resistor 32 will upset this balance and in effect be amplified to appear across a portion of the voltage sensing network of the voltage regulator.

FIGURE 2 is supplied only to show one of the many variations which may be made in the differential amplifier load division circuit of the present invention without deviating from the spirit of the invention. Other notable changes which may be made in the circuit shown, to name a few, is the substitution of PNP transistors with the appropriate change of voltage polarities for the NPN transistors shown. Also, individual emitter resistors may be included in addition to the common emitter resistor 50 to accomplish both a lowering of the gain of the circuit and prescribe a degree of balance or unbalance in the current conduction of the two transistors in addition to the variations which may be obtained by variable resistor 64.

Basically, the load division circuit of the present invention is a bridge circuit wherein, in FIGURE 2 for example, resistor 70 is the left-hand upper leg, resistor 72 is the left-hand lower leg, resistor 62 and the upper portion of resistor 64 form the right-hand upper leg, and resistors 32, 66 and the lower portion of resistor 64 are the right-hand lower leg. The base-emitter paths of the transistors are coupled across the bridge and thus when the bridge is in balance in the absence of a voltage differential appearing across resistor 32, no current flow is caused by the bridge circuit to flow through the transistor base-emitter paths.

It is intended that the specific examples of the circuit which have been shown are to be taken by way of description only.

What is claimed and desired to be secured by Letters Patent of the United States is:

1. In parallel operation of direct current generators of the type having a compensating winding and each controlled by a voltage regulator, a load division balancing circuit comprising a pair of controlled conducting devices each having a control electrode and first and second primary current conducting electrodes, the first electrodes of said controlled conducting devices being coupled to the generator output voltage of one of said generators, one first electrode being coupled to the voltage regulator of said one generator, the second electrodes of said controlled conducting devices being commonly coupled to the series compensating winding of each of said generators, voltage adjust means coupled to the control electrode of each of said controlled conducting devices to adjust the voltage at each control electrode to maintain each controlled conducting device in a quiescent conducting state, voltage sensing means coupled to the commonly coupled second electrodes of said controlled conducting devices, to the control electrode of one of said controlled conducting devices and to the series compensating winding of each of said generators to that unbalance in the current supplied by said generators causes greater voltage drop across one series compensating winding and a voltage difference between said compensating windings is developed across said voltage sensing means to drive said controlled conducting devices from their quiescent conducting state in proportion to the voltage difference, whereby the voltage regulator of said one generator senses a change of voltage at said one first electrode and adjusts the excitation to said one generator accordingly.

2. A load division balancing circuit as recited in claim 1 wherein said controlled conducting devices are transistors having their emitters commonly coupled through a common emitter resistor to a current path intercoupling said series compensating windings, and said voltage sensing means is a resistor in said current path having one end coupled to said emitter resistor and the other end coupled to the base of the transistor comprising said one controlled conducting device.

3. A load division balancing circuit as recited in claim 2 wherein said voltage adjust means includes voltage clamping means and adjustable voltage dividing means coupled across said voltage clamping means and to the base electrode of one of said transistors to provide means for adjusting the quiescent conducting state of said transistors so that transistor balance and substantially equal current conduction is obtained.

4. A load division balancing circuit as recited in claim 3 wherein the voltage sensing resistor forms a part of said adjustable voltage dividing means whereby the voltage differential appearing across said resistor adds to the constant voltage maintained at the base of said one transistor.

5. A load division balancing circuit as recited in claim 2 wherein each compensating winding is coupled between electrical ground and the armature of the generator and there is further included a resistor coupling said common emitter resistor to said electrical ground such that whenever said current path is interrupted, said transistors are provided with a current path to ground.

References Cited

UNITED STATES PATENTS

| | | | |
|---|---|---|---|
| 2,859,357 | 11/1958 | Schmeling | 307—57 |
| 3,022,427 | 2/1962 | Jensen | 307—57 |

ROBERT K. SCHAEFER, Primary Examiner

H. J. HOHAUSER, Assistant Examiner